(12) United States Patent
Ball

(10) Patent No.: US 11,461,711 B2
(45) Date of Patent: Oct. 4, 2022

(54) LANYAP VISUAL PRO

(71) Applicant: Richard Ball, Pearland, TX (US)

(72) Inventor: Richard Ball, Pearland, TX (US)

( * ) Notice: Subject to any disclaimer, the term of this patent is extended or adjusted under 35 U.S.C. 154(b) by 329 days.

(21) Appl. No.: 16/075,588

(22) PCT Filed: Feb. 3, 2017

(86) PCT No.: PCT/US2017/016440
§ 371 (c)(1),
(2) Date: Aug. 3, 2018

(87) PCT Pub. No.: WO2017/136680
PCT Pub. Date: Aug. 10, 2017

(65) Prior Publication Data
US 2019/0050785 A1   Feb. 14, 2019

Related U.S. Application Data

(60) Provisional application No. 62/290,592, filed on Feb. 3, 2016.

(51) Int. Cl.
| | |
|---|---|
| *G06Q 10/06* | (2012.01) |
| *G06F 16/00* | (2019.01) |
| *G06Q 30/00* | (2012.01) |
| *G06F 21/31* | (2013.01) |
| *G06Q 50/10* | (2012.01) |

(52) U.S. Cl.
CPC ..... *G06Q 10/063114* (2013.01); *G06F 16/00* (2019.01); *G06F 21/31* (2013.01); *G06Q 30/01* (2013.01); *G06Q 50/10* (2013.01)

(58) Field of Classification Search
CPC  G06Q 10/063114; G06Q 50/10; G06F 16/00; G06F 21/31
See application file for complete search history.

(56) References Cited

U.S. PATENT DOCUMENTS

| | | | | |
|---|---|---|---|---|
| 2011/0109460 A1* | 5/2011 | Lloyd | ............... | A01M 31/002 340/573.2 |
| 2014/0279600 A1* | 9/2014 | Chait | ............... | G06Q 30/018 705/317 |
| 2016/0132046 A1* | 5/2016 | Beoughter | ............... | G06F 16/248 700/17 |

* cited by examiner

*Primary Examiner* — A. Hunter Wilder
(74) *Attorney, Agent, or Firm* — Kearney, McWilliams & Davis, PLLC; William Yarbrough

(57) ABSTRACT

The present invention provides a computer-implemented system or an online platform to allow pest control company and inspector to access, manage and inspect plants or facilities. Specifically, the present invention provides a computer-implemented system or an online platform that provides tools for the pest control inspector to take one or more images of the bait station being inspected, incorporate notes pertaining to the bait station and save the images and notes on a secure webpage for future retrieval. The present invention also provides a computer-implemented system or an online platform for customers of the pest control company to monitor the tasks performed by the company and inspector by retrieving the images and notes saved by the inspector on a secure webpage.

12 Claims, 9 Drawing Sheets

222  217  218  219

222  217  218  219

222  217  218  219

227

216  217  218  219

211 212 213

227

214

211 212 213

LANYAP VISUAL PRO

CROSS-REFERENCE TO RELATED APPLICATION

This PCT International Patent Application claims benefit of U.S. Provisional Patent Application Ser. No. 62/290,592, filed Feb. 3, 2016.

FEDERAL FUNDING LEGEND

This invention was not created using federal funds.

BACKGROUND OF THE INVENTION

Field of the Invention

The present invention generally relates to a computer-implemented system that allows a pest control inspector to access, manage and easily inspect plants and the customer to see what the inspector has seen during his inspection of the customer's facility and the tasks undertaken by the inspector. More specifically, the present invention is drawn to a computer-implemented system or an online platform that allows a pest control inspector and customer to see visual images of the bait stations being scanned, inspected and monitored.

Conventional scanners used by pest control inspectors only report that a bar code assigned to a particular bait station has been scanned. As a result, the customers receive a report. informing them that a particular bait station in their facility has been inspected, without actually receiving any visual images of the bait station. Thus, there is a long-felt but significant and un-met need in the art for a computer-implemented system or an online platform that will allow the pest control inspector and the customer to see images of bait station in addition to receiving textual information about the inspection. The present invention satisfies this long-standing need in the art.

SUMMARY OF REPRESENTATIVE EMBODIMENTS OF THE INVENTION

In a preferred embodiment, the present invention is directed to a system for pest control and management, comprising: at least one computer having at least one processor, a memory, and a display connected to said processor, and at least one network connection; a server connected to the computer; an interactive tool connected to the computer, wherein the interactive tool comprises: at least one interactive module configured to receive, process, retrieve, send, or a combination thereof information, an image or both pertaining to a pest, a bait station or both, information, an image or both pertaining to a pest, a bait station, or both, inspection history, maps of the facility to be inspected, or a combination thereof; a database comprising a list of customers, customer details, the information pertaining to the pest, the bait station, or both, images pertaining to the pest, the bait station, or both, inspection history, maps of the facility to be inspected, or a combination thereof; wherein said database is accessed by the module; and a user interface that is coupled to the module and the database.

In a related embodiment, the system further comprises: a web backend interface to control the database.

In another related embodiment, the user interface comprises a user module, a keyboard, keys, a mouse, or a combination thereof.

In yet another related embodiment, the user module composes: a login module configured to allow the user to access the computer-implemented system using a user name, a password, to retrieve forgotten password, or a combination thereof; a download module, upload module, or both to download or upload the information, image or both pertaining to the pest, baitstation, or both; a customer module to search for customer names; a customer list module with the names of the customer; a customer detail module with the information of the customer; a bait station list module with the list of the bait station; a map module that has map of the facility to be inspected; a notes module to enter notes about the inspection; an edit notes module to edit the notes; a previous inspection list module to view list of previous inspection; an access module to access inspection details; a view inspection module to view information pertaining to previous inspection; an inspection history module to view history of the inspection; an add details of inspection module to add information pertaining to the inspection; a save details of inspection module to save the information pertaining to the inspection; a help module, wherein said module is associated with the download module, the upload module, or both; a start job module to start the inspection; a scan module to scan a machine-readable identifier of a bait station; an image module to take an image of the bait station, save image of the bait station, or both; a sync module to transmit the information collected during the inspection to the server; an end job module to end the inspection; or a combination thereof.

In still yet another related embodiment, the user is an administrator, a pest control inspector, or both.

In further yet another related embodiment, the user module comprises: a login module configured to allow the user to access the computer-implemented system using a user name, a password, to retrieve forgotten password, or a combination thereof a view inspection module to view the information pertaining to the inspection; a bait station module to access the bait station list, select bait station from the list, or both; a view image module to view image pertaining to inspection; a retrieve module to retrieve notes pertaining to the inspection, the image pertaining to the inspection, or both; a logout module to log out of the account; or a combination thereof.

In yet another related embodiment, the user is a customer.

In still yet another related embodiment, the computer is a laptop machine or computer, a desktop machine or computer, a smart phone, a tablet computer, a device that can scan machine-readable identifier, an explosion proof mobile device, or similar device.

In another preferred embodiment, the present invention is directed to a computer-implemented method for conducting pest control, comprising: accessing the user interface of the interactive tool of the system described herein; accessing the user module of the user interface to login to the system; pressing the sync module to download information with server; accessing customer module to select customer list; selecting specific customer from the customer list; accessing the map module to obtain map of the customer's facility; accessing the previous inspection list module, the access module, the view inspection module, the inspection history module, or a combination thereof; selecting start job module to start the inspection; accessing the bait station list module to access the bait station, accessing the scan module to scan the machine-readable identifier of the bait station or both;

accessing add details of inspection module, the notes module, the edit notes module or a combination thereof to incorporate information pertaining to the inspection; accessing image module to take the image of the bait station, save image of the bait station or both; accessing end job module to end the inspection; or a combination thereof.

In a related embodiment, the information incorporated in the system comprises findings at the bait station, treatment type, pest type, activity found at the bait station, or a combination thereof.

In yet another preferred embodiment, the present invention is directed to a computer implemented method for monitoring the pest control and treatment, comprising: accessing the user interface of the interactive tool of the system described herein; accessing the user module of the user interface to login to the system; accessing the inspection module, the bait module, the view image module, or a combination thereof; accessing the retrieve module to retrieve the information pertaining to the inspection, the image pertaining to the inspection or both; accessing the log out module to log out of the system; or a combination thereof.

In a related embodiment, the information pertaining to the inspection comprises findings at the bait station, treatment type, pest type, activity found at the bait station, or a combination thereof.

BRIEF DESCRIPTION OF THE DRAWINGS

FIG. 2 shows the dashboard 210 of the scanner 200 with the login module 101.

FIG. 3 shows the dashboard 210 of the scanner 200 with the sync module 214.

DESCRIPTION OF PREFERRED EMBODIMENTS

Figure 1:
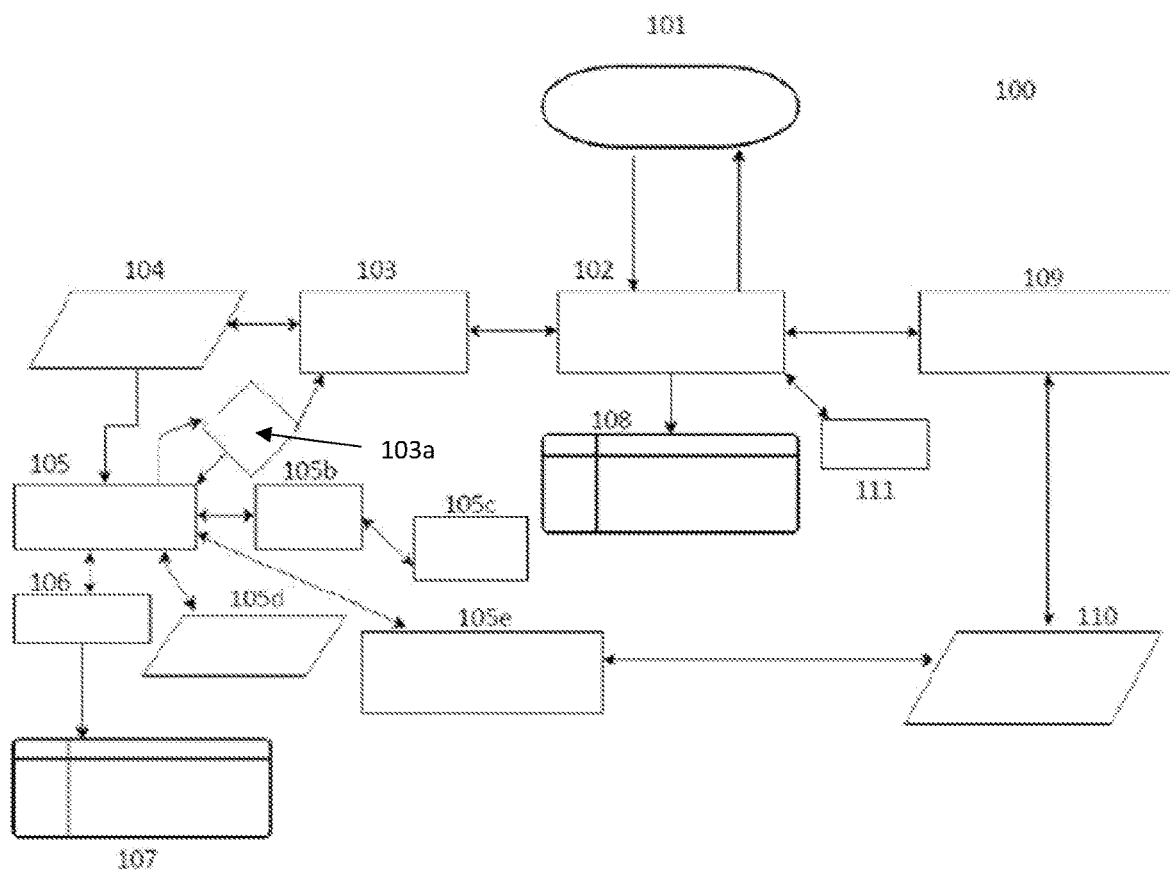
FIG. 1 provides a flowchart 100 evidencing an operator interface.

The present invention provides a computer-implemented system or an online platform to scan, photograph, and describe activity of pests in its enclosure. Preferably, this computer-implemented system or an online platform allows a pest control inspector to access, manage and easily inspect plants by visualizing the bait station that is being scanned and monitored and incorporate notes related to that bait station. This computer-implemented system or the online platform takes images, reports text and other information pertaining to individual bait station and sends the images, text and other information to data storage system, for instance, Cloud, for customer retrieval. In a related embodiment, the computer-implemented system or the online platform comprises a mobile app and a web backend interface for the administration/inspector to control the app data. The app is built under any operating system, including but not limited to the Android platform and it enhances the way the Pest Control inspectors do inspections. Additionally, this system also allows customer to see the inspector's comments regarding the pest control performed in their facility and the images taken by the inspector while inspecting the customer's facility.

In a preferred embodiment, the present invention provides the computer-implemented system that allows a pest control inspector to efficiently perform his tasks, allows the customer of the pest control company to monitor the tasks performed by the inspector or both. In a related embodiment, the computer implemented system comprises at least one computer having at least one processor, a memory, and a display connected to said processor, and at least one network connection; a server connected to the computer; an interactive tool connected to the computer, wherein the interactive tool comprises: at least one interactive module configured to receive, process, retrieve, send, or a combination thereof information, an image or both pertaining to a pest, a bait station or both, information, an image or both pertaining to a pest, a bait station, or both, inspection history, maps of the facility to be inspected, or a combination thereof; a database comprising a list of customers, customer details, the information pertaining to the pest, the bait station, or both, images pertaining to the pest, the bait station, or both, inspection history, maps of the facility to be inspected, or a combination thereof; wherein said database is accessed by the module; and a user interface that is coupled to the module and the database. In a related embodiment, the system further comprises: a web backend interface to control the database. In a related embodiment, the user interface comprises a user module, a keyboard, keys, a mouse, or a combination thereof.

In a related embodiment, the user module comprises: a login icon configured to allow the user to access the computer-implemented system using a username, a password, an icon to retrieve forgotten password, or a combination thereof; a download module, upload module, or both to download or upload the information, image or both pertaining to the pest, bait station, or both; an icon accessible customer module for searching names; an icon accessible customer list module with the names of customers; an icon accessible customer detail module with information of customers; an icon accessible bait station list module with the list of bait stations; an icon accessible map module having a map of a facility to be inspected; an icon accessible notes module to enter notes about an inspection; an icon accessible edit notes module to edit the notes; an icon accessible previous inspection list module to view list of previous inspection; an access icon to access an inspection details module; an icon to access a view inspection module to view information pertaining to previous inspections; an inspection history icon to access an inspection history module to view history of an inspection; an add details access icon to enter an inspection module to add information pertaining to the inspection; a save details icon of an inspection module to save information pertaining to an inspection; icon accessible help module, wherein said module is associated with the download module, the upload module, or both; a start job icon to start the inspection; a scan icon to scan a machine-readable identifier of a bait station; an image icon to access an image gather function take an image of the bait station, save image of the bait station, or both; a sync module to transmit the information collected during the inspection to the server; an end job icon enabling an end the inspection; or a combination thereof. In another related embodiment, the user is an administrator, a pest control inspector, or both.

In a related embodiment, this computer-implemented system allows a pest control inspector to perform tasks that include but are not limited to taking visual images of the bait station, incorporating notes pertaining to the bait station or combination thereof, uploading or downloading the images, notes or combination thereof onto a secure web page, thereby visualizing what is being scanned, and monitored and storing the visual images and notes for future retrieval, checking the inspection history, and viewing the map of the facility being inspected.

In another related embodiment, the user module comprises: a login module icon configured to allow the user to access the computer-implemented system using a username, a password, an icon to allow retrieval of a forgotten password, or a combination thereof; an icon accessible view inspection module to view information pertaining to an inspection; an icon enabled bait station module to access a bait station list, select bait station from a list, or both; an icon accessible view image module to view images pertaining to inspection; an icon accessible retrieve module to retrieve notes pertaining to an inspection, an image pertaining to the inspection, or both; a logout icon to log out of an account; or a combination thereof.

In a related embodiment, the user is a customer.

In another related embodiment, the computer-implemented system allows a customer of a pest control company to monitor the tasks performed by a pest control inspector by allowing said customer to retrieve the visual images, notes or combination thereof of uploaded or downloaded data onto a secure web page by the inspector or administrator of the web page.

In yet another embodiment, visual images, notes and combination thereof are uploaded or downloaded after every inspection and stored on a web page for in perpetuity or for a definite period of time.

In still yet another embodiment, a bait station is identified by a machine-readable identifier that includes but is not limited to a bar code, specific numbering, or similar means of identification.

In another embodiment, said computer-implemented system may be used with or without a scanner that scans a bar code.

In further yet another embodiment, said computer-implemented system allows an inspector and customer to compare the visual images and notes over a period of time.

In yet another embodiment, said computer-implemented system allows an inspector to perform tasks that include but are not limited to access to customer details, maps of an area that an inspector is going to inspect, list of bait stations, inspection list, inspection details, or help function.

In another embodiment, the inspector, pest control company and customer can access the computer-implemented system or webpage by means of a specific username and a password. In yet another embodiment, notes incorporated by the inspector include but are not limited to scope of service, treatment type, type of pest, or the number of times the station was inspected.

In another embodiment, an online platform is utilized to identify the bait station that has been inspected.

In still yet another embodiment, the online platform can be accessed on devices including but not limited to an explosion proof mobile device, laptop machine or computer, a desktop machine or computer, a smart phone, a tablet computer, a device that scans machine readable identifier, ipad, iphone or other mobile device.

In another preferred embodiment, the present invention provides a computer-implemented method for conducting pest control, comprising: accessing the user interface of the interactive tool of the system described herein; accessing the user module of the user interface to login to the system; pressing the sync module to download information with server; accessing customer module to select customer list; selecting specific customer from the customer list; accessing a map module to obtain map of the customer's facility; accessing a previous inspection list module, the access module, the view inspection module, the inspection history module, or a combination thereof; selecting start job module to start an inspection; accessing the bait station list module to access a bait station, accessing the scan module to scan the machine-readable identifier of said bait station or both; accessing add details of inspection module, the notes module, the edit notes module or a combination thereof to incorporate information pertaining to the inspection; accessing image module to take the image of the bait station, save image of the bait station or both; accessing end job module to end the inspection; or a combination thereof. In yet another related embodiment, the information incorporated in the system comprises findings at the bait station, treatment type, pest type, activity found at the bait station, or a combination thereof.

For instance, the method described herein comprises launching the online platform on a device, logging in to the online platform by using specific username, which includes but is not limited to email address of the user and a password, pressing the sync module to download data which allows all data and company information to be synched with the backend or the admin panel, accessing customer list by selecting customer option in the computer-implemented system, selecting a specific customer from the list, accessing the map of the customer's plant, checking the inspection history or a combination, selecting start option to start job, selecting the bait station from the station list for that customer using the select module or using a bar code to scan to select a bait station, incorporating information in the station inspection fields, where the information includes but is not limited to findings at that station, treatment type, pest type, any activity found, and notes, taking one or more images of the bait station, or a combination thereof, saving the images, one or more of the information or a combination thereof in the computer-implemented system, and completing the inspection by selecting end function in the computer-implemented system. In another embodiment, the inspector adds or edits notes after he accesses the station list. In yet another embodiment, the inspector accesses customer list, bait station list, plant map, bait station list, or previous inspection details in a random sequence.

In yet another preferred embodiment, the present invention provides a computer-implemented method for monitoring the pest control and treatment, comprising: accessing the user interface of the interactive tool of the system described herein; accessing the user module of the user interface to login to the system; accessing the inspection module, the bait module, the view image module, or a combination thereof; accessing the retrieve module to retrieve the information pertaining to the inspection, the image pertaining to the inspection or both; accessing the log out module to log out of the system; or a combination thereof. In another related embodiment, the information pertaining to the inspection comprises findings at the bait station, treatment type, pest type, activity found at the bait station, or a combination thereof.

For instance, the customers of pest control company may be able to monitor the tasks performed by a pest control inspector using the online platform described above. Such a method comprises logging in using a specific username and a password, accessing the bait station list, selecting a bait station from the list, retrieving one or more images of the bait station selected, retrieving notes pertaining to the bait station selected and logging out of the platform by selecting end function.

The computer-implemented system described herein is unique because it provides a tool that serves a dual purpose. For instance, the customer and the pest control company can use this computer-implemented system to visualize images of the bait station inspected. The pest control inspector can also use this system to incorporate his notes prior to and after he conducts the inspection. Additionally, the computer-implemented system can be used on bait stations that have bar codes and those that are identified by other means, including but not limited to numbers. Accordingly, the computer-implemented system is not restricted to the use of bar code scanners. Further, the online platform can be built under any operating system.

The flowchart 100 in FIG. 1 showing the computer-implemented system, in one embodiment, which allows the administration/inspector to record data and store data on the internet for the customer to retrieve after the inspector inspects the facility. The inspector/administrator can login using the login module 101, which is present on the dashboard 210 of the scanner 200 (as shown in FIGS. 2-7). The administrator/inspector (not shown) can download or upload data using download or upload data module 102 and then save said data which can be later retrieved using retrieval module 108. The inspector/administrator can then access customer list using module 103 after [[he]] said operator downloads/uploads data. Said operator can then access customer details using customer details module 104 and start the operation (e.g., individual job) by accessing station list using station list module 105, add the details of inspection using station inspection module 106 and save the data using 107. Said operator can then end the job after he said operator accesses station list by accessing module 105a and go back to module 103, via module 103a. The operator then can also add notes using the notes module 105b or edit notes using the edit notes module 105c after he accesses station list module 105a. In yet another embodiment, operator can view location maps by accessing module 105d through station list module 105a. In another embodiment, said operator can also access previous inspections list module 105e after operator accesses the station list module 105 and then said operator can, as well, access inspection details module 110, through previous inspection list module 109, download/upload data, via download or upload data module 102, and then log out. There is also a help module 111 associated with the download/upload data module 102.

Figure 2:
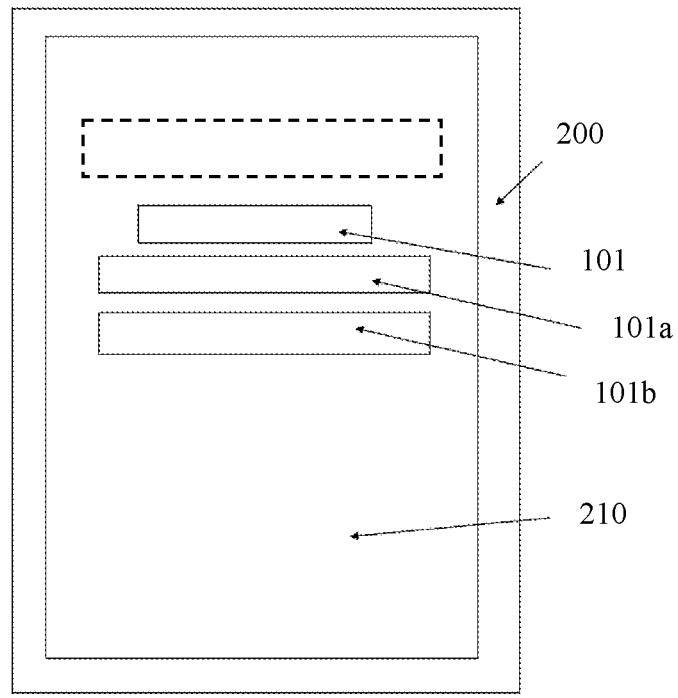
FIG. 2 illustrates one of the embodiments described herein.
Figure 3:
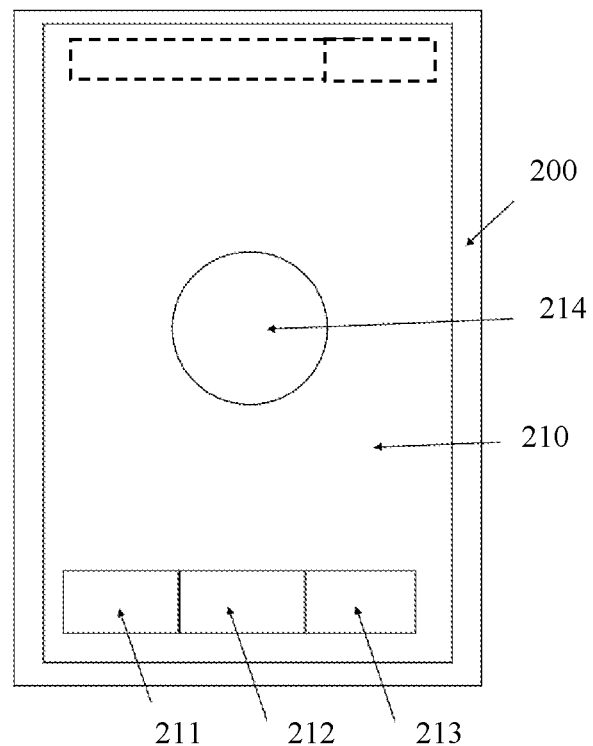
FIG. 3 illustrates another embodiment described herein.
Figure 4:
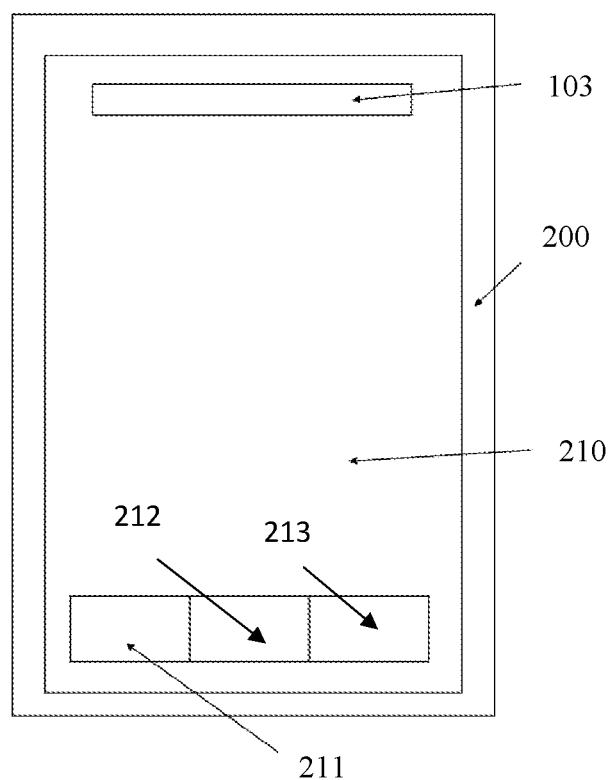
FIG. 4 illustrates yet another embodiment described herein, showing the customers list module 103 on the dashboard 210 of the scanner 200 when the user selects the customers module 211 on the dashboard.
Figure 5:
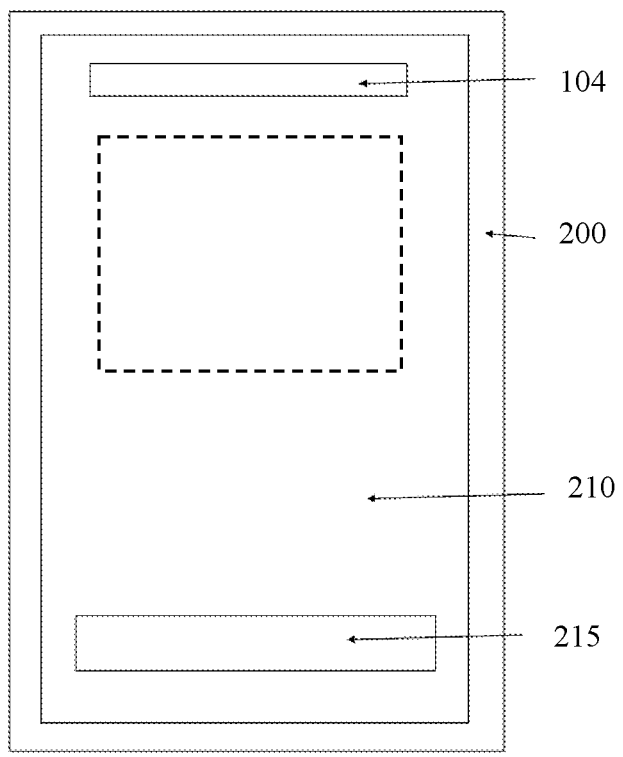
FIG. 5 illustrates still yet another embodiment showing the customer detail module 104, which can be accessed by selecting a specific customer from the customers list module 103 on the dashboard 210 of the scanner 200.
Figure 6:
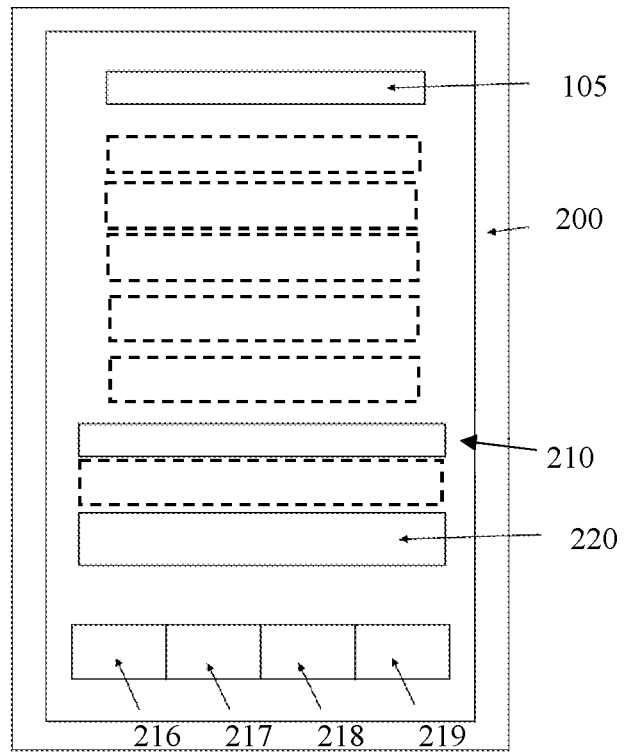
FIG. 6 illustrates another embodiment described herein, showing the stations list module 105, scan module 216, plant map module 217, inspection history module 218, notes module 219, and end job module 220 on the dashboard 210 of the scanner 200.

FIGS. 2-16 illustrate some of the embodiments described herein. FIG. 2 shows the dashboard 210 of the scanner 200 with the login function icon 101. In one embodiment, the user types said username by accessing module 101 via icon 101a and password by selecting icon 101b to login. FIG. 3 shows the dashboard 210, after login, of the scanner 200 with a sync icon 214. The data including, but not limited to, all contacts, companies, data incorporated by the user will be synched with the backend or admin panel (not shown). The synching module, accessible through the syncing module access interface icon 214, requires an internet connection. FIG. 3 also shows some functions that the user can use includes, but are not limited to, customer list access icon 211, inspection history access interface icon 212, and help access icon 213. FIG. 4 shows the customers list module 103 appearing after operator accesses (i.e., selects) said customer list through depression of said customer list access icon 211 on the dashboard 210 of the scanner 200. FIG. 5 shows the customer details icon 104, which can be accessed by selecting a specific customer from the customers list module 103 on the dashboard 210 of the scanner 200. The dashboard 210 also shows the start job icon 215 which user can select to start the operation (e.g., inspection job). FIG. 6 shows the stations list module 105, scan module access interface icon 216, plant map module access interface icon 217, history module access interface icon 218, notes access module interface icon 219, and end job function icon 220 on the dashboard 210 of the scanner 200. The user can select stations for inspection using the stations list module 105a or can use a bar code and scan the bar code to select a specific station (not shown).

Figure 7:
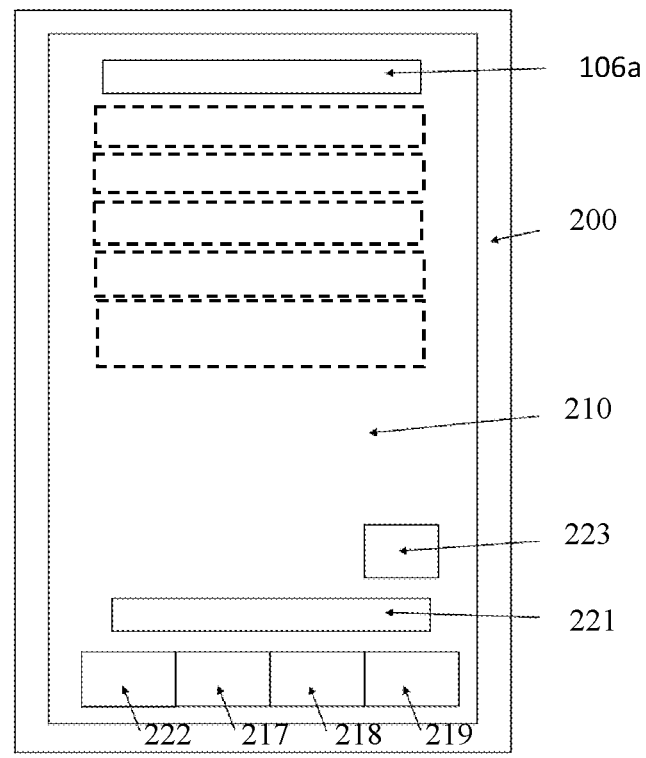
FIG. 7 illustrates yet another embodiment described herein showing the Station inspection module 106 on the dashboard 210 of the scanner 200 in addition to the inspect module 222, plant map module 217, inspection history module 218, notes module 219, and save module 221.

FIG. 7 shows another embodiment of the present invention whereby access icon 106a is evidenced for selection of station inspection module 106 on the dashboard 210 of the scanner 200 in addition to an inspect module access interface icon 222, plant map module access interface icon 217, history module access interface icon 218, notes module access interface icon 219, and save module access interface icon 221. The user can incorporate data in the station inspection module 106 including but not limited to findings, treatment type, type of pest, notes, and activity found. The user can add visual data by select selecting add image module access interface icon 223 to take a picture of the specific bait station. Operator then has the option to select the save function, via actuation of the save module access interface icon 221, to save all data and images. This data is saved locally on the present device and will not be transmitted to the back office or administrative panel unless the user selects the sync module (not shown).

Figure 8:
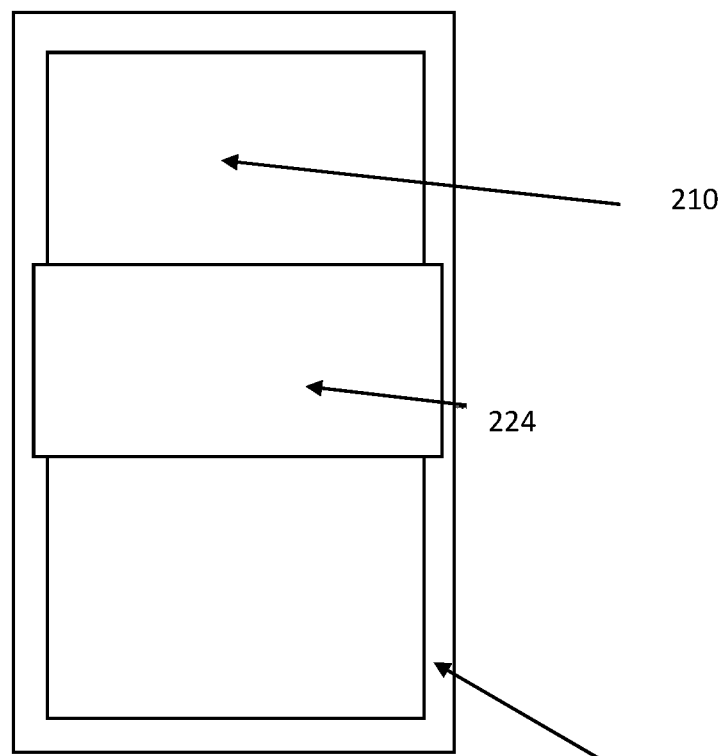
FIG. 8 illustrates still yet another embodiment described herein. It shows the dashboard 210 of the scanner 200 where the user has the option to select a bait station by reading the bar code by using a bar code reader 224 on the scanner 200.

FIG. 8 shows the dashboard 210 of the scanner 200 where the user has the option to select a specific bait station by reading a bar code through use of a bar code reader module (not shown) accessible through bar code reader module icon 224. In one embodiment, the user selects inspect module access interface icon 222 (See FIG. 7) to read a bar code using the bar code reader module icon 224 of a particular station to access each stations specific identifying information.

Figure 9:
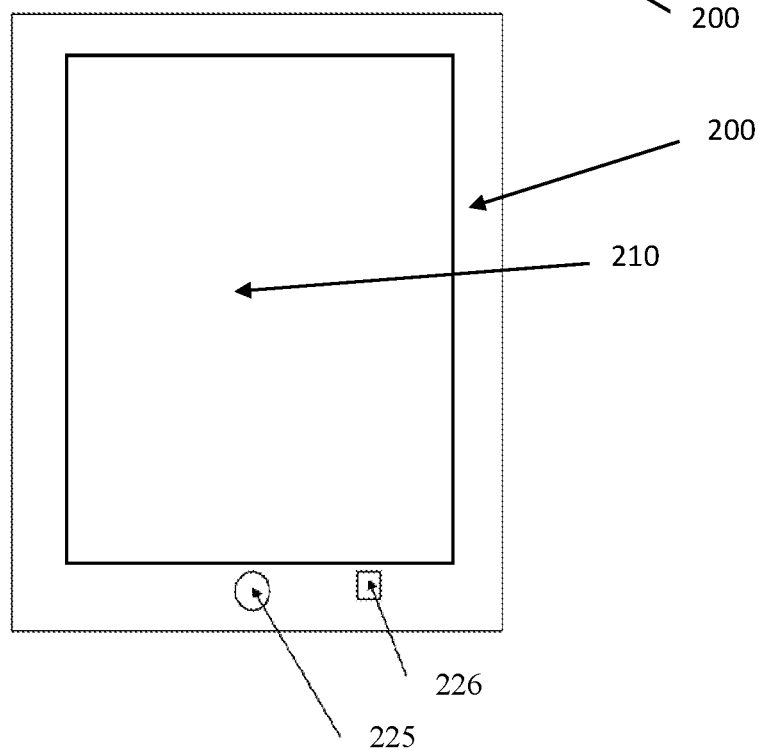
FIG. 9 illustrates another embodiment described herein depicting how the user can take a picture using the scanner 200.

FIG. 9 shows how the user can take a picture using the scanner 200. To take the picture, the user selects module access icon 225, which in this case, for instance, is placed on the bottom middle of the dashboard 210. If the user is satisfied with the picture, then he can select function icon 226 placed on the bottom next to function icon 225.

Figure 10:
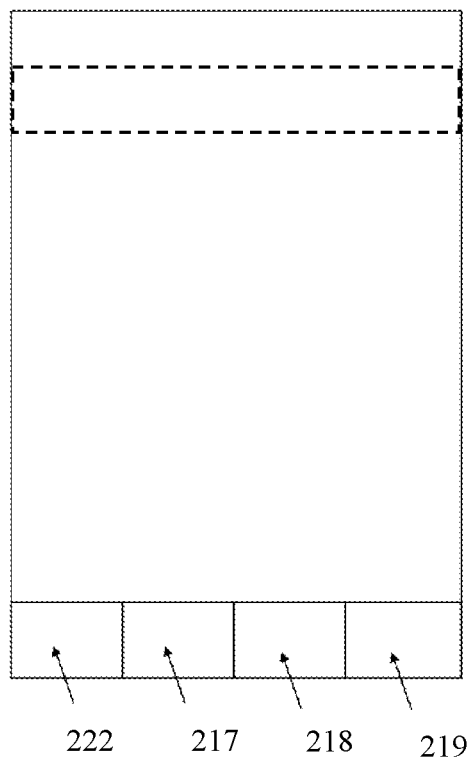
FIG. 10 illustrates yet another embodiment described showing the inspections list which can be accessed by selecting inspection history module 218 on the dashboard 210 of the scanner 200 and modules such as inspect module 222, plant map module 217, and notes module 219.

FIG. 10 shows an inspections list which can be accessed by selecting inspection history module access interface icon 218 on the dashboard 210 of the scanner 200. Also, shown in the figure, are modules such as inspect module access interface icon 222, plant map module access interface icon 217, and notes module access interface icon 219.

Figure 11:
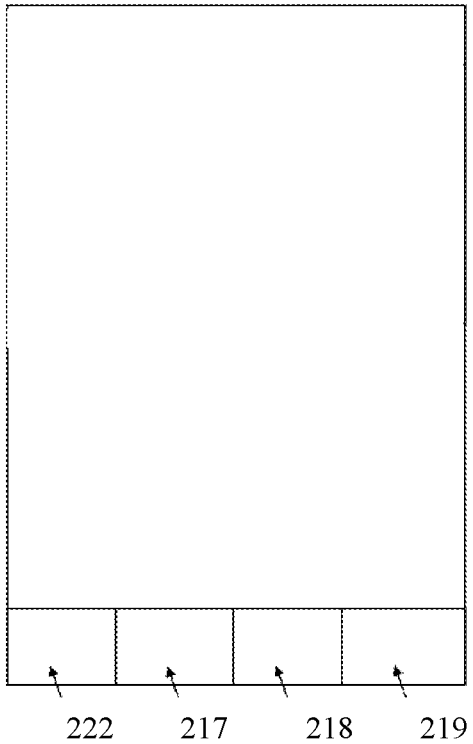
FIG. 11 illustrates further yet another embodiment described herein showing whereby the user can add notes by selecting the notes module 219 on the dashboard 210 of the scanner 200.

FIG. 11 shows how the user can add notes by selecting the notes module 219 on the dashboard 210 of the scanner 200. Also, shown in the figure are modules such as inspect module access interface icon 222, plant map module access interface icon 217, and history module access interface icon 218.

Figure 12:
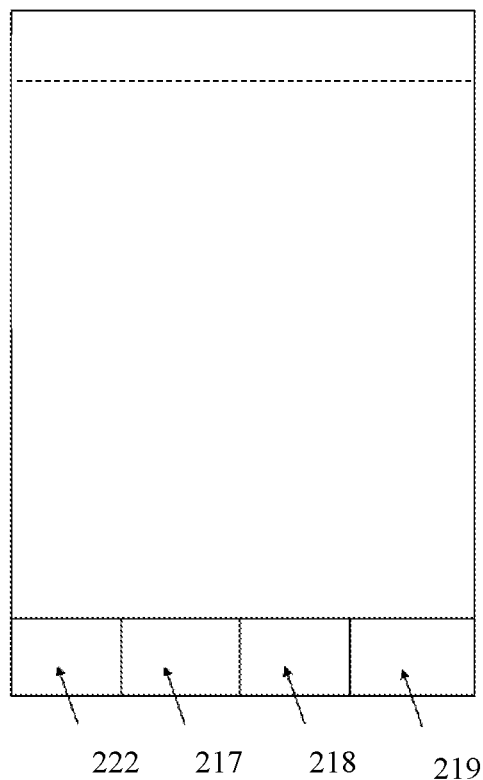
FIG. 12 illustrates another embodiment described herein evidencing how the user can view the map of the facility by selecting plant map module 217 on the dashboard 210 of the scanner 200.

FIG. 12 shows how the user can view the map of the facility by selecting plant map module access interface icon 217 on the dashboard 210 of the scanner 200. Also, shown in the figure are modules such as inspect module access interface icon 222, history module access interface icon 218, and notes module access interface icon 219.

Figure 13:
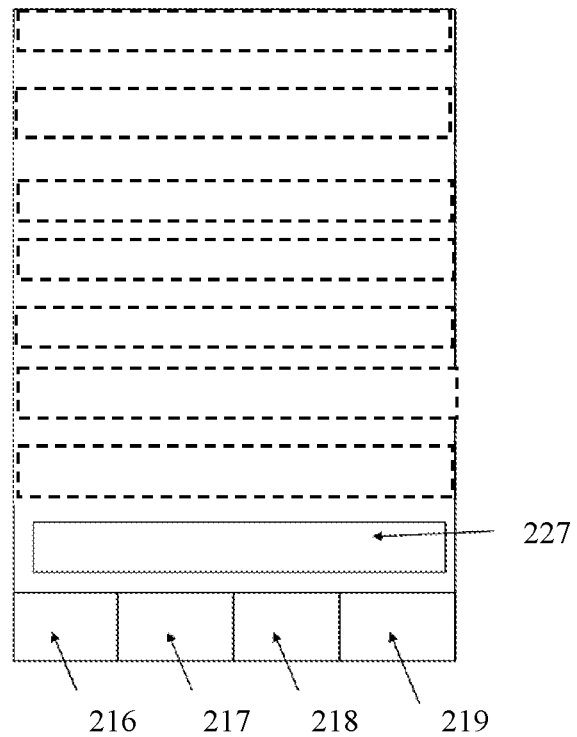
FIG. 13 illustrates yet another embodiment showing how the user can end job by selecting end job module 227 on the dashboard 210 of the scanner 200

FIG. 13 shows how the user can end job by selecting end job module access interface 220 on the dashboard 210 of the scanner 200. Also, shown in the figure are modules such as scan module access interface icon 216, plant map module access interface icon 217, history module access interface icon 218, and notes module access interface icon 219.

Figure 14:
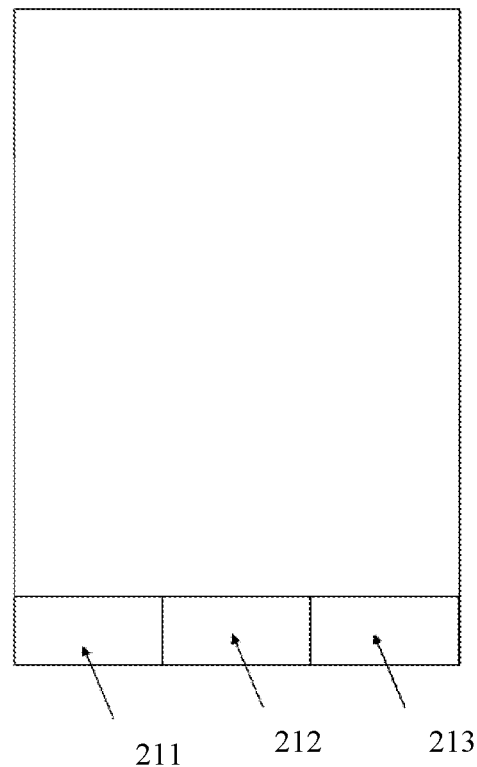
FIG. 14 illustrates still yet another embodiment showing how the user can get help by selecting the help module 213 on the dashboard 210 of the scanner 200.

FIG. 14 shows an alternative screen depicting how the user can get help by selecting the help module access interface icon 213 on the dashboard 210 of the scanner 200. Also, shown in the figure are modules access interfaces such as customers list access interface icon 211 and inspection history access interface icon 212.

Figure 15:
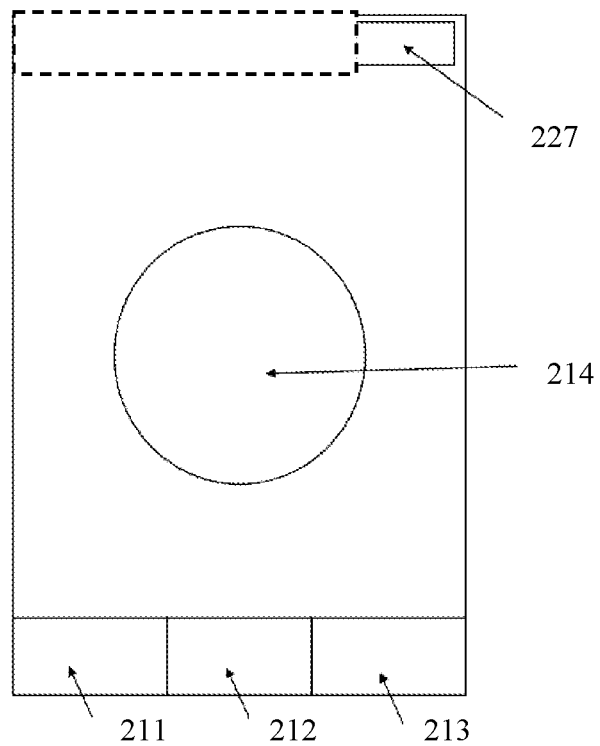
FIG. 15 illustrates yet another embodiment displaying whereby the user can log out or upload the recent inspection details to the server.

FIG. 15 shows how the user can log out or upload the recent inspection details to the server. To log out, the user can select the logout module access interface icon 227 on the dashboard 210 of the scanner 200. If the user wants to upload the inspection details to the server, operator can select the sync module access interface icon 214. Also, shown in the figure are modules such as customers list access interface icon 211, inspection history list access interface icon 212, and help list access interface icon 213.

Figure 16:
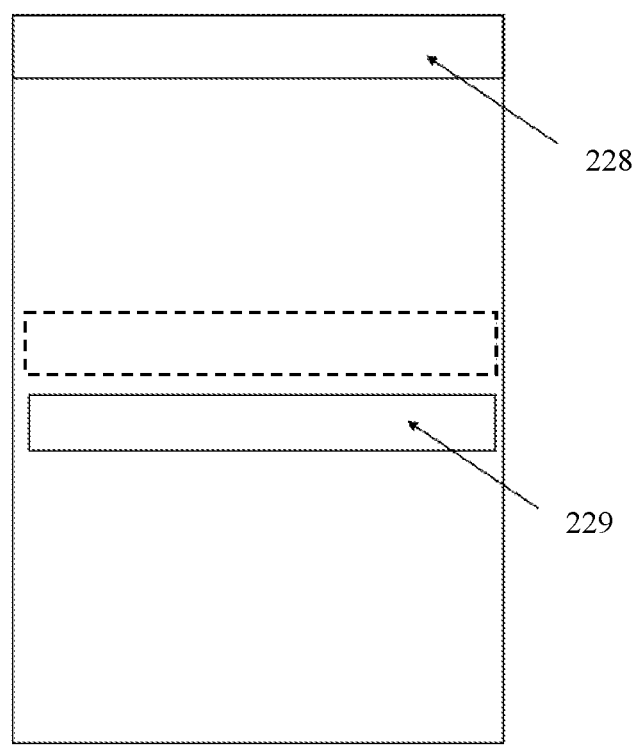
FIG. 16 illustrates still yet another embodiment shows how the user can recover his password, whereby, in order to recover his password, the user will have to select forgot password module 228 on the dashboard 210 of the scanner 200, type his user email, and select recover password module 229.

FIG. 16 shows how the user can recover his password. To recover his password, the user has to select forgot password module access interface icon 228 on the dashboard 210 of the scanner 200, type his user email, and select recover password module access interface icon 229.

The features described herein are the preferred embodiments and do not restrict the makings of the computer-implemented system described herein. Thus, the computer-implemented system can be implemented using. any type of compiler and any type of computer hardware system, network system, or other platforms. As used herein, the term "computer hardware system" is intended to include all the necessary components of a computer system that are required to run or execute a source program and that allow someone to use the computer. By way of non-limiting example, the hardware components include, but are not limited to, a power supply, motherboard, hard disk, graphics card, Random access memory (RAM), and other hardware components. Additional hardware components can include, for instance, a keyboard, mouse, speakers, etc.

It is contemplated that the methods of the present invention can therefore be implemented by operation of any type of computer system that includes computer components including but not limited to a processor, memory storage devices for the processor, connected display devices, and input devices. Furthermore, the methods of the present invention can be implemented by operation of computer components in a heterogenous distributed computing environment, including for example one or more remote file servers, computer servers, and/or memory storage devices. Each of these distributed computing components is accessible by the processor via a communication network, which may include but is not limited to, the Internet.

As used herein, the term "user interface" refers to one or more tools that allow the user to communicate with the operating system. The examples of the user interface include but are not limited to a user module, a keyboard, keys, a mouse, or a combination thereof.

It is to be understood that the term "user" shall include, but is not limited to, (i) an individual who performs the task of pest control (including, by way of example, a pest control inspector), (ii) an administrator who manages a computer-implemented system or online platform as described herein, or (iii) a customer of the pest control company.

As used herein, the term "machine-readable identifier" shall include, but is not limited a bar code, a specific numbering, or similar means of identification.

The foregoing descriptions of the embodiments of the present invention have been presented for purposes of illustration and description. They are not intended to be exhaustive or to limit the present invention to the precise forms disclosed. The exemplary embodiments were chosen and described in order to best. explain the principles of the present invention and its practical application, to thereby enable others skilled in the art to best utilize the present invention.

What is claimed is:

1. A system for pest control and management, comprising:
at least one computer having at least one processor, a memory, a scanner, a display connected to said processor, and at least one network connection;
a server connected to the computer via the at least one network connection;
an interactive tool connected to the at least one computer, wherein the interactive tool comprises:
a scan module configured to scan, using the scanner, a machine-readable identifier of a bait station upon selection of a scan icon by a pest control inspector;
at least one interactive module configured to receive, process, retrieve, and send collected inspection data in the form of an image or images and written information collected from the pest control inspector with regard to the scanned bait station, wherein said collected inspection data pertains to inspection details including: a pest, a pest type, the bait station, treatment type, inspection history, and maps of an area inspected, and a sync module configured to sync the collected inspection data with the server upon selection of a sync icon by the pest control inspector;

a database comprising customer lists, customer details, information pertaining to pests, the bait station, images pertaining to said pests, the inspection history, and the maps of the area to be inspected, wherein said database is accessible by said at least one interactive module; and a user interface coupled to said database via said at least one interactive module, wherein said collected inspection data is retrievable by the pest control inspector via the user interface to monitor pest control inspector's inspection tasks, pest activity and said collected inspection data, and wherein said inspector's tasks and collected inspection data are comparable over time, and wherein said collected inspection data is further monitored by the pest control inspector, a customer and an administrator.

2. The system of claim 1, further comprising: a web backend interface to control said database.

3. The system of claim 1, wherein the user interface comprises user modules, and the at least one computer comprises: a keyboard, keys, a mouse, or a combination thereof.

4. The system of claim 3, wherein the user modules comprise:
a login icon configured to allow a user to access the computer-implemented system using a username and password;
an icon to retrieve a forgotten password;
a download module, upload module, or both, to download, or upload, information, image(s), or both, pertaining to pests, bait stations, areas, inspections, inspector tasks or a combination thereof;
a customer icon to search for customer names and customer lists;
a customer list icon to access customer lists;
a customer detail module with customers information;
a bait station list icon for accessing a bait station module having a list of bait stations;
a map icon for accessing a map module having a map of an area to be inspected;
a notes icon for accessing a notes module to enter written data about an inspection;
an edit icon for editing written data;
a previous icon accessing an inspection list module to view a list of previous inspection(s);
an access icon accessing an access module to access inspection details;
a view inspection icon accessing a view inspection module to view information pertaining to previous inspection;
an inspection history icon accessing an inspection history module to view history of inspection(s);
an add details of inspection icon accessing a module to add information pertaining to an inspection;
a save details of inspection icon accessing a module to save the information pertaining to inspection(s);
a help icon accessing a help module, wherein said module is associated with the download module, the upload module, or both;
a start job icon accessing a module to start an inspection;
the scan icon accessing the module to scan the machine-readable identifier of the bait station;
an image icon accessing a module to take a visual image of a bait station, save image of a bait station, or both;
the sync icon accessing the module to transmit collected information during the inspection or inspections to the server;
an end job icon accessing a module to end an inspection;
or a combination thereof.

5. The system of claim 1, wherein said at least one interactive module comprises:
a login icon configured to allow a user to access the system using a username, a password, to retrieve forgotten password, or a combination thereof;
a view inspection icon configured to allow the user to access a view inspection module to view the information pertaining to an inspection;
a bait station icon to access a bait station module to access a bait station list, select bait station from the list, or both;
a view image icon to access a module to view image pertaining to an inspection;
a retrieve icon to access a module to retrieve notes pertaining to the inspection, the image pertaining to the inspection, or both;
a logout icon to access a module to log out of the account; or a combination thereof.

6. The system of claim 5, wherein the collected inspection data further comprises:
bait station activity status,
and
bait station activity, or a combination thereof.

7. The system of claim 1, wherein the computer is a laptop machine or computer, a desktop machine or computer, a smart phone, a tablet computer, a device that can scan machine-readable identifier, an explosion proof mobile device, or similar device.

8. A computer-implemented method for conducting pest control, comprising:
providing the system of claim 1;
accessing the user interface of the interactive tool;
accessing the at least one interactive module of the user interface to login to the system;
selecting the sync icon to access the sync module to download information from the server;
accessing customer list module, through selection of customer list icon, to select view customer list;
selecting a specific customer from the customer list;
accessing a map module to obtain a map of a customer's facility;
accessing a previous inspection list module, an access module, a view inspection module, an inspection history module, or a combination thereof;
selecting start job icon to access a start job module to start the inspection;
accessing a bait station list module to access a bait station, accessing the scan module to scan the machine-readable identifier of the bait station or both;
accessing add details of inspection module, a notes module, an edit notes module, or a combination thereof, to incorporate information pertaining to the inspection;

accessing an image module, through an image icon, to collect a visual image of a bait station, save image of a bait station or both; and selecting end job module to end the inspection, or a combination thereof.

9. The method of claim 8, wherein the information incorporated in the system comprises findings at a bait station image or written information, including treatment type, pest type, pest activity found at a bait station, or a combination thereof.

10. A computer-implemented method for monitoring pest control inspectors, pest control and pest treatment, comprising:

providing the system of claim 1;

selecting a user interface icon of the interactive tool of the system and accessing the at least one interactive module of said user interface to log into the pest control and management system;

accessing an inspection module, a bait module, a view image module, or a combination thereof, through selection of a corresponding icon;

accessing an input module, via selection of an input icon, to input written information pertaining to an inspection, input an image or images pertaining to an inspection or both;

accessing a retrieve module, via selection of a retrieve icon, to retrieve previous inspection history comprising written information pertaining to an inspection, an image or images pertaining to an inspection, or both, if present;

conducting, by the pest control inspector, a visual inspection;

collecting, a pest control inspector, inspection details;
said inspection details comprising bait station status, treatment type, activity found at a bait station, or a combination thereof;

comparing, by a pest control inspector, current versus historical data, if present;

downloading or uploading inspection details;

storing, transmitting, or a combination thereof, inspection details; and selecting a log out icon of a log out module to log out of the system.

11. The method of claim 10, wherein said collection inspection data is compared by the pest control inspector, the customer the administrator, or a combination thereof.

12. The method of claim 10, wherein said collection inspection data is utilized to monitor, compare and verify inspector tasks, inspection history, pest activity, bait station (s), bait station status, treatment status, treatment type, area maps, or a combination thereof.

* * * * *